United States Patent [19]

Douglas

[11] 4,399,440
[45] Aug. 16, 1983

[54] ADDRESSABLE TRANSDUCER WITH A VARIABLE FREQUENCY OSCILLATION FOR MONITORING A PHYSICAL QUANTITY

[75] Inventor: Norman F. Douglas, Albuquerque, N. Mex.

[73] Assignee: Sparton Corporation, Jackson, Mich.

[21] Appl. No.: 235,349

[22] Filed: Feb. 17, 1981

[51] Int. Cl.³ .................. G08C 19/16; G08C 19/04
[52] U.S. Cl. .................. 340/870.26; 340/870.03; 340/870.11; 340/870.38; 340/870.39; 340/870.07; 340/870.18
[58] Field of Search .................. 340/870.03, 370.26, 340/870.38, 870.18, 870.11, 310 R, 310 A, 870.07, 870.39; 179/175.3 R

[56] References Cited

U.S. PATENT DOCUMENTS

| | | | |
|---|---|---|---|
| 3,800,300 | 3/1974 | Van Oosterhout | 340/870.26 |
| 3,944,928 | 3/1976 | Augenblick et al. | 340/870.18 |
| 3,952,285 | 4/1976 | Falck | 340/870.11 |
| 4,204,195 | 5/1980 | Bogacki | 340/870.11 |

Primary Examiner—James J. Groody
Attorney, Agent, or Firm—Reising, Ethington, Barnard, Perry, Brooks & Milton

[57] ABSTRACT

An addressable transducer is disclosed for use in monitoring the values of physical conditions in connection with long electric lines, such as telephone cables. Multiple transducers are connected across a single pair of transmission lines which extend from a central station and supply a DC voltage to the transducers. Each transducer has an assigned address in the form of a binary code. An address signal is transmitted on the transmission lines by pulse width modulation of the line voltage. An address detector converts the address to a binary code and the transmitted address is compared with the assigned address. When the assigned address is received, a variable frequency current sink oscillator is turned on and connected across the lines. The oscillator has a frequency determined by a sensor responsive to the physical condition being measured and modulates the line current at that frequency. The frequency of the line current modulation is measured at the central station and represents the value of the physical condition.

5 Claims, 7 Drawing Figures

ADDRESSABLE TRANSDUCER WITH A VARIABLE FREQUENCY OSCILLATION FOR MONITORING A PHYSICAL QUANTITY

FIELD OF THE INVENTION

This invention relates to monitoring systems for monitoring the values of physical quantities at remote locations. More particularly, it relates to a transducer which responds to an address signal by developing a signal which represents the value of a physical quantity being monitored.

BACKGROUND ART

Monitoring systems for monitoring physical quantities or parameters are used in many applications such as manufacturing plants, chemical processing plants, pipe lines and telephone cables. The physical quantities monitored include fluid pressure, flow rate, temperature, humidity, etc. An important application is that of monitoring fluid pressure in telephone cables. This application typically requires the use of transducers at monitoring points which may be located up to one hundred miles or so from the monitoring or central station. In this kind of application, it is desired to use a large number of transducers with a minimum of transmission lines and power requirements while realizing a high degree of accuracy and reliability in the acquisition of data representing the values of the monitored physical quantities.

In the prior art, the Goldstine et al U.S. Pat. No. 3,327,289 discloses a remote monitoring system especially adapted for multiple transducers. The central station is connected through a pair of wires to multiple remote transducers each of which is selectively responsive to a tone frequency. An interrogator circuit at the central station selectively applies the tone frequencies to the pair of wires and a constant current source is continuously connected to the pair of wires. When a transducer receives the tone frequency assigned to it, a switching transistor is turned on and a variable resistor representing the physical quantity is connected across the pair of wires. Compensation is provided for the resistance of the wires and the voltage appearing on a resistor at the central station is proportional to the value of the quantity being monitored.

The Whiteside U.S. Pat. No. 4,103,337 discloses a monitoring system in which data is transmitted from a remote sensor using a form of analog to pulse width to digital conversion. A central processor transmits a data request signal on a single wire transmission line to the remote sensor. The data request signal activates the sensor and the interfaced electronics and also provides electrical power thereto. Upon receipt of the data request signal, the interface electronics generates a low impedance to ground signal on the transmission line after a time lapse corresponding to the value of the quantity being monitored. The low impedance to ground signal is detected by the central processor which terminates the data request signal. The central processor includes a pulse width to digital converter which produces a digital signal indicative of the time duration of the data request signal and hence the value of the quantity.

The Gowen U.S. Pat. No. 3,438,019 relates to a monitoring system especially adapted for measuring voltages at selected test points in complex electronic systems. This patent discloses a central computer with multiple remote stations for monitoring a voltage at each station. Each station senses the test voltage and a voltage-to-frequency converter produces a pulse train having a frequency which is a function of the sensed voltage. The individual sensors at different locations are gated in sequence. When the output of a voltage-to-frequency converter is gated on, the data signal is transmitted to the central computer where the frequency is measured and compared with standard values corresponding to the particular test point. The standard values are stored in a computer memory and accessed according to the test point being interrogated. The system does not give a value readout of the voltage being measured; instead it merely tells whether the measured value is within limits. The system includes a voltage source at each remote point for energizing the voltage-to-frequency converter.

The Connelly U.S. Pat. No. 3,629,855 relates to a transducer monitoring system for use in connection with process control systems. In the system of this patent, multiple transducers are remotely located and each is connected with an intermediate level selector by individual transmission lines. There are plural intermediate level selectors which are connected to a master level selector which, in turn, is connected with an address scanner and a computer. When a signal condition changes at a transducer, the associated receiver generates an event flag. This causes a signal to be sent through the intermediate level selector to the master level selector and the address scanner searches the intermediate level detectors and the individual transducers to identify the one which transmitted the event flag. When the transducer is found, its address and the sense of the signal change are recorded by the central computer. The signal conditioner is described as a particular logic level pulse-width encoder and additionally the patent mentions other signal conditioners, such as voltage-to-frequency converters.

Other patents which disclose remote monitoring systems are Swanson, No. 4,090,248; Shih, No. 4,123,796; Actor et al, No. 4,153,945 and Iechenlaub, No. 4,156,929.

A general object of this invention is to provide an improved transducer for use in a monitoring system.

SUMMARY OF THE INVENTION

This invention provides a transducer especially adapted for use in monitoring the value of physical quantities in connection with long-line telephone cables and similar installation. The transducer operates with a minimum of power consumption which is drawn from the central station; it produces a high signal-to-noise ratio in transmitting the data signal and it avoids introducing interference into voice and data communication lines.

According to the invention, multiple transducers are connected across a single pair of transmission lines which extend from a central station and supply a DC voltage to the transducer. Each transducer has an assigned address, in the form of a binary code, and is interrogated in response to receipt of its assigned address signal. The address signal is transmitted on the pair of transmission lines by pulse width modulation of the line voltage. An address detector converts the address to a binary code and the transmitted address is compared with the assigned address. When the assigned address is received, an oscillator, which is a variable frequency current sink oscillator, is turned on and connected across the lines. The oscillator has a frequency determined by a sensor responsive to the physical quantity being monitored and modulates the line current at that frequency. The frequency of the line current modulation is measured at the central station and translated to the value of the physical quantity being monitored.

A more complete understanding of this invention will be obtained from the detailed description that follows taken with the accompanying drawings.

BEST MODE FOR CARRYING OUT THE INVENTION

Referring now to the drawings, there is shown an illustrative embodiment of the invention in an addressable transducer for use in a monitoring system which is adapted for monitoring values of physical conditions at a large number of locations some of which may be a long distance from the central station of the system. This embodiment is especially adapted for use in monitoring a telephone cable installation with multiple transducers being connected through the same pair of transmission lines to the central station. In particular, the individual transducers are selectively addressed by a pulse width modulated voltage applied to the pair of lines at the central station. The address signal is effective to interrogate that transducer having the transmitted address. The addressed transducer responds by producing current modulation in the lines at a frequency corresponding to the value of the physical condition being monitored. The frequency is measured at the central station as an indication of the value of the physical condition. It will be apparent as the description proceeds that the invention may be used in many different applications and it may be implemented in different ways.

Figure 1:
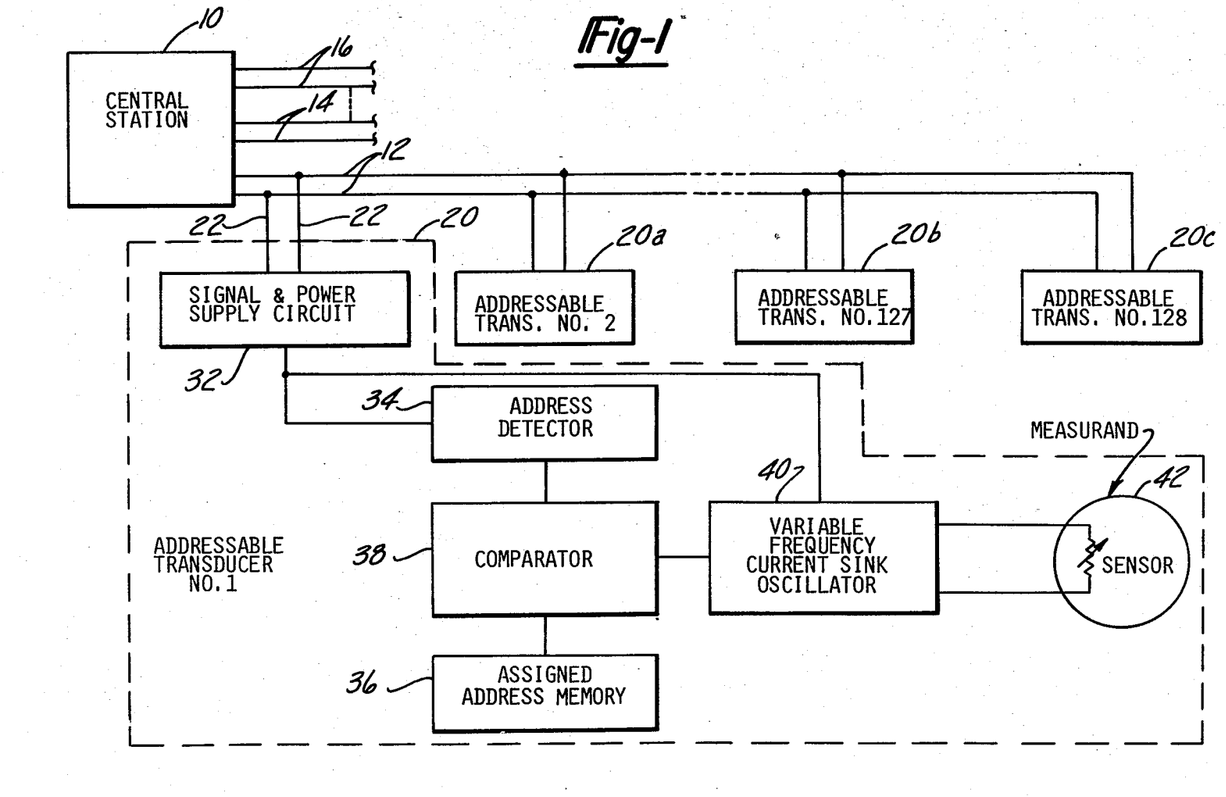
FIG. 1 is a block diagram showing addressable transducers in a monitoring system according to this invention.

As shown in FIG. 1, the monitoring system comprises a central station 10, such as a telephone cable maintenance center which is adapted to automatically monitor physical quantities, such as fluid pressure, at spaced points along a cable. For this purpose, a transmission line pair 12, sometimes known as a control pair, extend through the cable to reach the most remote point on the cable to be monitored. As indicated, the central station may be capable of monitoring a number of cables, there being a separate transmission line pair, such as pairs 14 and 16, for each cable. The transmission line pair 12 is connected with multiple addressable transducers such as transducers 20, 20a, 20b, and 20c, which in the illustrative embodiment number up to 128, are located at monitoring points along the cable. The transducer 20 is connected with the transmission line pair by a pair of input/output terminals 22 and, similarly, all of the transducers are connected in parallel across the line pair.

The transducer 20 comprises, in general, a signal and power supply circuit 32 which is connected with an address detector 34 and a variable frequency current sink oscillator 40. The address detector 34 and an assigned address memory 36 are connected with a comparator 38 for comparing a received address signal with the assigned address. When they are the same, the output of the comparator turns on the oscillator 40 which oscillates at a frequency determined by a sensor 42 responsive to the value of the physical quantity being monitored. The oscillator 40 produces current modulation of the line current in the transmission line pair 12. The frequency of the current modulation is measured at the central station.

Figures 2, 5:
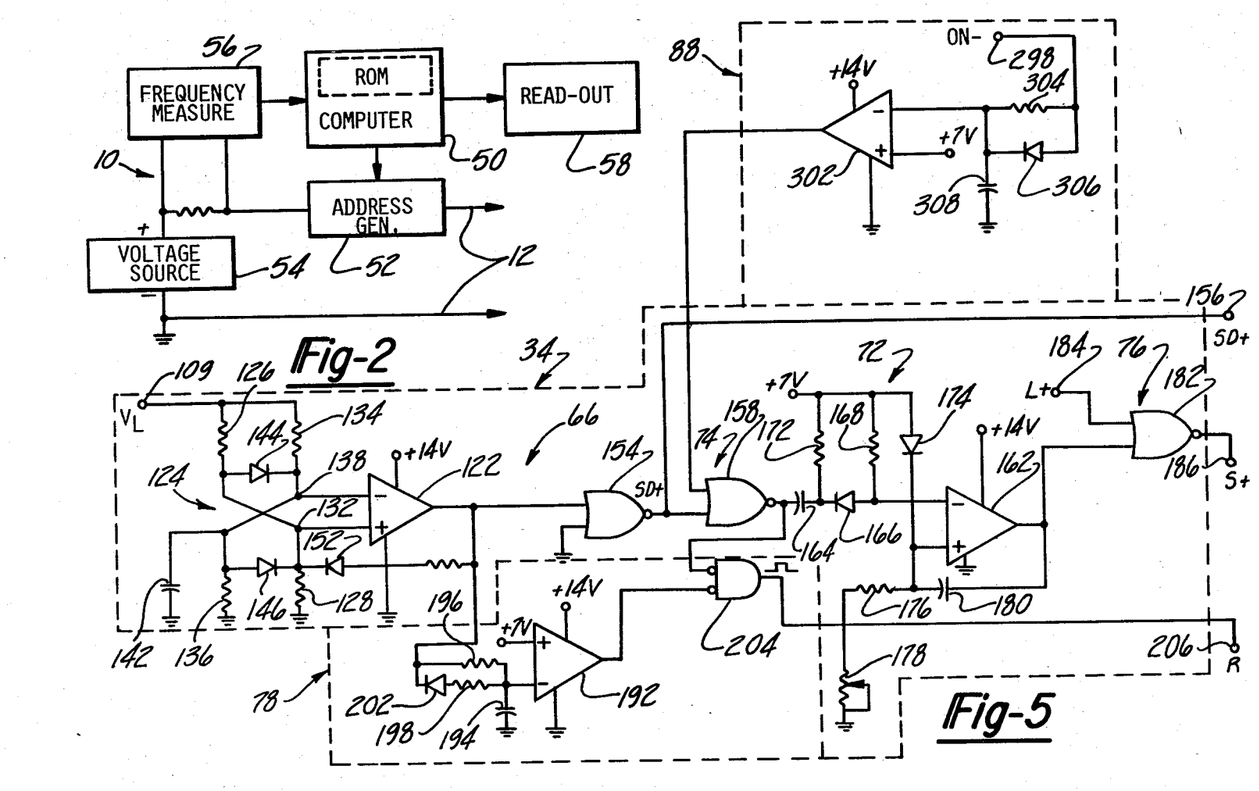
FIG. 2 is a block diagram of the central station of the monitoring system.
FIGS. 4 and 5 taken together constitute a schematic diagram of the addressable transducer.

The central station 10 is depicted in further detail in FIG. 2. It comprises a computer 50 for providing programmed control of the interrogation of multiple transducers and the processing of the answers received from the transducer in the form of variable frequency data signals. For this purpose, the computer 50 controls an address generator 52 which is coupled with the transmission line pair 12. The transmission line pair is powered by a DC voltage source 54. The address generator 52 modulates the line voltage with pulse width and amplitude modulation to produce a serial binary address code. The computer stores a different address code for each addressable transducer and applies the addresses in sequence to the address generator 52 for sequential interrogation of the transducers. When a given transducer receives its address signal, it responds by producing a data signal on the transmission pair in the form of a current modulation at a frequency corresponding to the value of the measured physical quantity or measurand. A frequency measuring circuit 56 is coupled to the transmission line pair and supplies a signal corresponding to the measured frequency to the computer 50. The frequency of the data signal has a non-linear relation with the value of the measured quantity and the computer is operative to translate the frequency value to the value of the quantity. This is accomplished by use of look-up tables stored in a read only memory (ROM) in the computer. The computer compares the value of the measured frequency with the values in the look-up table and produces an output corresponding to the value of the measured quantity. This is supplied to a readout 58 which displays the value measured by the responding transducer. The computer then causes generation of the address of the next transducer to be interrogated.

Figure 6:
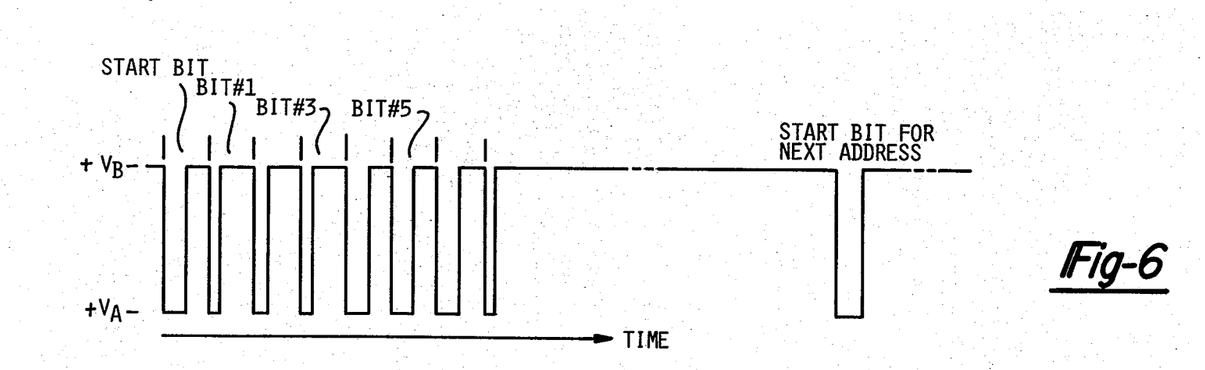
FIG. 6 is a waveform diagram representing an address code.

Before proceeding with the description of the circuitry, it will be helpful to consider the character of the voltage applied to the transmission line pair by the central station. A typical address code which is modulated on the line voltage is shown in FIG. 6. In the quiescent state, i.e. the absence of signal activity on the transmission line pair, the line voltage has a positive DC, steady state value. The value of this steady state voltage B at the input of a given transducer is dependent upon the location of the transducer on the line pair. For a transducer close to the central station, the line voltage may be about 50 volts whereas a transducer at the remote end of a long-line may be as low as 28 volts, depending upon the current drawn through the line. The transducer addresses are applied to the line pair by amplitude and pulse width modulation of the supply voltage. Each address code is an eight bit binary serial pulse train, as shown in FIG. 6. A zero bit is represented by a 50 millisecond pulse width and a one bit is represented by a 100 millisecond pulse width. Each address code includes a lead or start bit which is a binary one for all address signals. The remaining seven bits of the address code are either ones or zeros according to the assigned code. In the example, shown in FIG. 6, the address code including the start bit, is 10001110. Typically, the address transmission rate is about three bits per second. It is noted that the last bit of the address code, bit number seven, is followed by a period in which no address code is modulated on the line voltage; during this period, however, an answer or data signal produced by the transducer does modulate the line current, as will be described below. In normal operation, after the data signal has been received by the central station, the computer initiates the transmission of the next address signal to interrogate another transducer.

Figure 3:
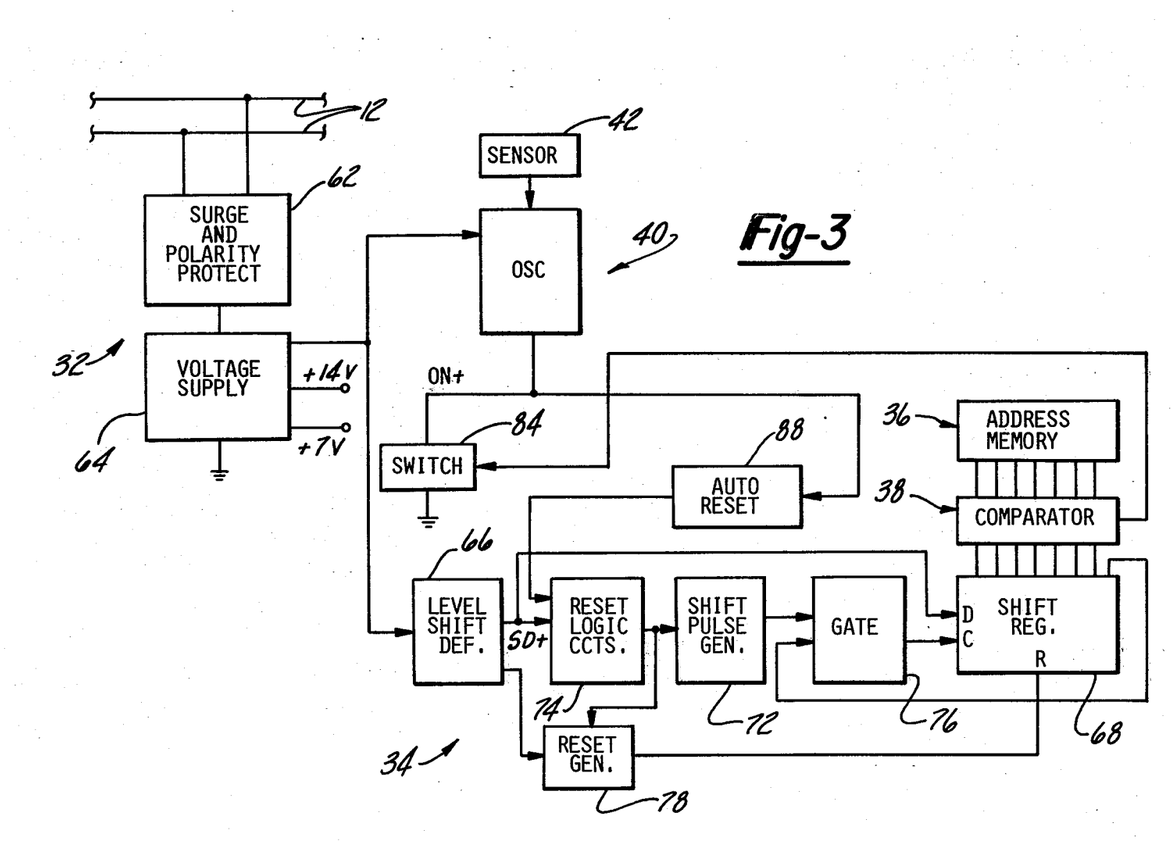
FIG. 3 is a block diagram of the addressable transducer.

The addressable transducer of this invention is shown in block diagram in FIG. 3. The signal and power supply circuit 32 comprises a surge and polarity protection circuit 62 having input terminals connected across the line pair 12. It also comprises a voltage supply circuit 64 which develops the required voltages for the different circuits of the transducer.

The address detector 34 comprises a level shift detector 66 which receives an input voltage from the output of the voltage supply circuit 62. The output of the level shift detector 66 is applied to the data input of a shift register 68. A shift pulse generator 72, which receives input from the level shift detector through a reset logic circuit 74, produces shift pulses which are applied to the clock input of the shift register 68 through a gate 76. A reset signal for the shift register 68 is developed by a reset generator 78 which receives an input signal from the level shift detector 66. The reset signal is applied to the reset input of the shift register 68. The output of the shift register is applied to one input of the comparator 38 which receives the assigned address from the assigned address memory 36 on its other input. When the address on the output of the shift register 68 is equal to the assigned address, the comparator 38 applies a logic signal to an electronic switch 84 in the voltage supply circuit of the oscillator 40. This completes the voltage supply circuit and starts the oscillator which modulates the current in the transmission line pair 12 at a frequency determined by the sensor 42. An automatic reset circuit 88 receives a signal from the switch 84 and, under certain circumstances, it is operative through the reset logic circuit to turn the oscillator off.

The transducer circuits will now be described in greater detail with reference to the schematic diagrams of FIGS. 4 and 5. The input/output terminals 22 of the addressable transducer 20, as mentioned above, are connected with the transmission line pair 12. The surge and polarity protection circuit 62 is connected across the terminals 22 and is adapted to protect the remaining circuits of the transducer from voltage surges and from inadvertant connection of the transducer with reverse polarity. For this purpose, it comprises a series resistor 102 and a shunt surge arrestor 104. For reverse polarity protection, a bridge rectifier 106 is connected across the surge arrestor. The line voltage $V_L$ is developed at the positive terminal 108 of the rectifier, the negative terminal being connected to ground. The line voltage $V_L$ is applied across the voltage regulator 64 through a series resistor 110 of large ohmic value to a pair of voltage regulating devices 112 and 114. Each of the regulating devices 112 and 114 is a PNP transistor connected in the manner of a zener diode. The devices 112 and 114 are connected in series with each other between the resistor 110 and ground. Regulating device 112 develops supply voltage of +14 volts across a capacitor 116. Regulating device 114 develops a regulated voltage of +7 volts across a capacitor 118. The line voltage $V_L$ which is developed at terminal 108 is applied across a voltage supply circuit 120 for the oscillator 40 in a manner which will be described subsequently. This line voltage $V_L$ is also applied as the input signal to the address detector 34 which will be described next.

The address detector 34, shown in FIG. 5, receives the line voltage $V_L$ at the input of the level shift detector 66. The level shift detector 66 comprises an operational amplifier (op amp) 122 and a voltage divider network 124. The level shift detector 66 is adapted to respond to the amplitude modulation of the address signal pulses and produce an output signal SD+ which includes pulses of enhanced pulse shape corresponding with the address pulses. The voltage divider network 124 comprises a pair of divider resistors 126 and 128 connected in series between the terminal 109 and ground. A node 132 between the resistors 126 and 128 is connected with the non-inverting input of the op amp 122. Another pair of divider resistors 134 and 136 are serially connected between the terminal 109 and ground. A node 138 between these resistors is connected with the inverting input of the op amp 122. The resistors 126 and 134 suitably have the same ohmic value but the resistor 128 is larger than resistor 136. A capacitor 142 is connected in parallel with the resistor 136. A pair of diodes 144 and 146 are connected in parallel with reverse polarity between the nodes 132 and 138 and are operative to limit the voltage between the nodes to the diode forward voltage drop, about 0.6 volts. The output of the op amp 122 is connected through a feedback resistor 148 and a diode 152 to the non-inverting input so that the op amp functions in the manner of a Schmidt trigger. The input voltages $V_L$, as alluded to above, may have a steady state or unmodulated value in the range of 28–50 volts. The amplitude modulation may reduce the voltage to about 21 volts for each pulse. In operation, the voltage at the node 132 follows the amplitude modulation in a linear manner whereas the voltage at node 138 follows it in a nonlinear manner due to capacitor 142. Before the receipt of the start pulse, the line voltage $V_L$ will be in a steady state condition long enough for the capacitor 142 to be charged and because of the difference in voltage division by the resistors 128 and 136, the node 132 will be more positive than node 138 and the output of the op amp 122 will be at logic high. At the occurrence of the leading edge of the start pulse, the voltage at node 132 will decrease with it in a linear manner whereas the voltage at node 138 will decrease more slowly due to the time constant of the circuit. As a result, the output of the op amp 122 goes to logic low. When the trailing edge of the start pulse occurs, the voltage at node 132 increase with it whereas the voltage at node 138 increase more slowly and the output of the op amp goes from logic low to logic high.

The level shift detector 66 also includes a NOR gate 154 which functions as an inverter. For this purpose, one input is connected with the output of the op amp 122 and the other input is connected to ground. The output of the NOR gate 154 is a serial data signal SD+ which represents the address modulation on the line voltage. The serial data signal SD+ appears on the terminal 156 and is applied to the shift register 68 (FIG. 4). The serial data signal SD+ is also applied by way of the reset logic circuit 74 to the input of the shift pulse generator 72.

The reset logic circuit 74 serves as a gate for use in developing a reset signal under certain operating conditions which will be described subsequently; it also inverts the serial data signal SD+ for use as input to the shift pulse generator 72. It comprises a NOR gate 158 having one input which receives the SD+ signal from the output of NOR gate 154. The other input of gate 158 is connected with the output of the automatic reset circuit 88 which will be described in detail subsequently. The output of the automatic reset circuit 88 is normally low; for present purposes, it is sufficient to note that it is low during receipt of an address signal. Accordingly, the output of the NOR gate 158 is the inverse of the SD+ signal. This output is applied to the input of the gate 204 which will be described subsequently. It is also applied to the input of the shift pulse generator 72 which will be described next.

The shift pulse generator 72 is adapted to generate a shift pulse having a predetermined time duration in response to the leading edge of each address pulse. The shift pulse generator takes the form of a one-shot multivibrator comprising an op amp 162. The output of the NOR gate 158 is applied to the inverting input of the op amp 162 through a capacitor 164 and a diode 166. The anode and cathode of the diode 166 are each connected through respective resistors 168 and 172 to the 7 volt regulated supply voltage. A voltage divider, including a diode 174, a resistor 176 and a variable resistor 178, is connected across the regulated voltage supply. The non-inverting input of the op amp 162 is connected to the junction of the diode 174 and resistor 176. A feedback capacitor 180 is connected between the output of the op amp 162 and the non-inverting input. The output of the op amp 162 goes from logic low to logic high when the output of the NOR gate 158 goes from logic high to logic low. The output of the op amp 162 stays at logic high for a preset time, about 75 milliseconds, which may be adjusted by the variable resistor 178. After the preset time interval, the output of the op amp 162 goes to logic low. Thus, the output of the op amp is a train of positive pulses having leading edges which are substantially coincident with the leading edges of the address pulses. The duration of the output pulses of the op amp 162 is greater than a logic zero address pulse (about 50 milliseconds) and it is less than a logic one address pulse (about 100 milliseconds). The output of the op amp 162 constitutes the output of the shift pulse generator 72 and it is applied to one input of the gate 76.

The gate 76 serves to invert the output of the shift pulse generator and it also functions to gate the shift pulses in accordance with the state of an inhibit signal L+ which will be discussed subsequently. The gate 76 comprises a NOR gate 182 with one input connected to the output of the op amp 162 and another input which receives the inhibit signal L+ from a terminal 184. The inhibit signal L+ is in a logic low state during the receipt of an address signal. Accordingly, during the address signal the NOR gate 182 produces an output which is the inverse of the output of the op amp 162. The output of the NOR gate 184 is a register shift signal S+ which appears at terminal 186. The signal S+ is applied to the shift register 68 (FIG. 4) which will be described subsequently.

Before describing the shift registor 68, it will be helpful to consider the circuits for developing the reset signal R, as shown in FIG. 5. The reset generator 78 takes the form of a re-triggerable one-shot multivibrator which is adapted to go from logic low to logic high a first predetermined time after receiving a logic low input and the output remains high for a second predetermined time. The reset generator 78 comprises an op amp 192 which has its inverting input connected with the output of the op amp 122 through a time constant network. The time constant network includes a capacitor 194 having one terminal connected to ground and its other terminal connected through a resistor 196 to the output of the op amp 122. The network also includes a resistor 198 and a series diode 202 connected in parallel with the resistor 196. The junction of the capacitor 194 and resistor 196 is connected with the inverting input of the op amp 192. The resistor 196 is in the charging circuit of capacitor 194 and has an ohmic value which is many times greater than the ohmic value of resistor 198, which is connected in the discharging circuit of the capacitor. When an address start pulse is received or when any other activity on the line causes the output of the op amp 122 to go low, the output of the op amp 192 will stay low for about 10 milliseconds and then go to logic high and remain there for about 500 milliseconds after the last logic low output of the op amp 122. The reset generator also includes a negative input NAND gate 204. This NAND gate has one inverting input connected with the output of the op amp 192. The other inverting input of the NAND gate 204 is connected to the output of the NOR gate 158. The output of the NOR gate 158 is at logic low during the address start bit and it is also logic low at the end of the time the oscillator is on, as will be described subsequently. Thus, the NAND gate 204 produces a logic high output pulse of about 10 milliseconds duration in response to the address start pulse. This output of the NAND gate 204 is the reset signal R which appears on the terminal 206 and is applied to the shift register 68, which will be described next.

Figure 4:
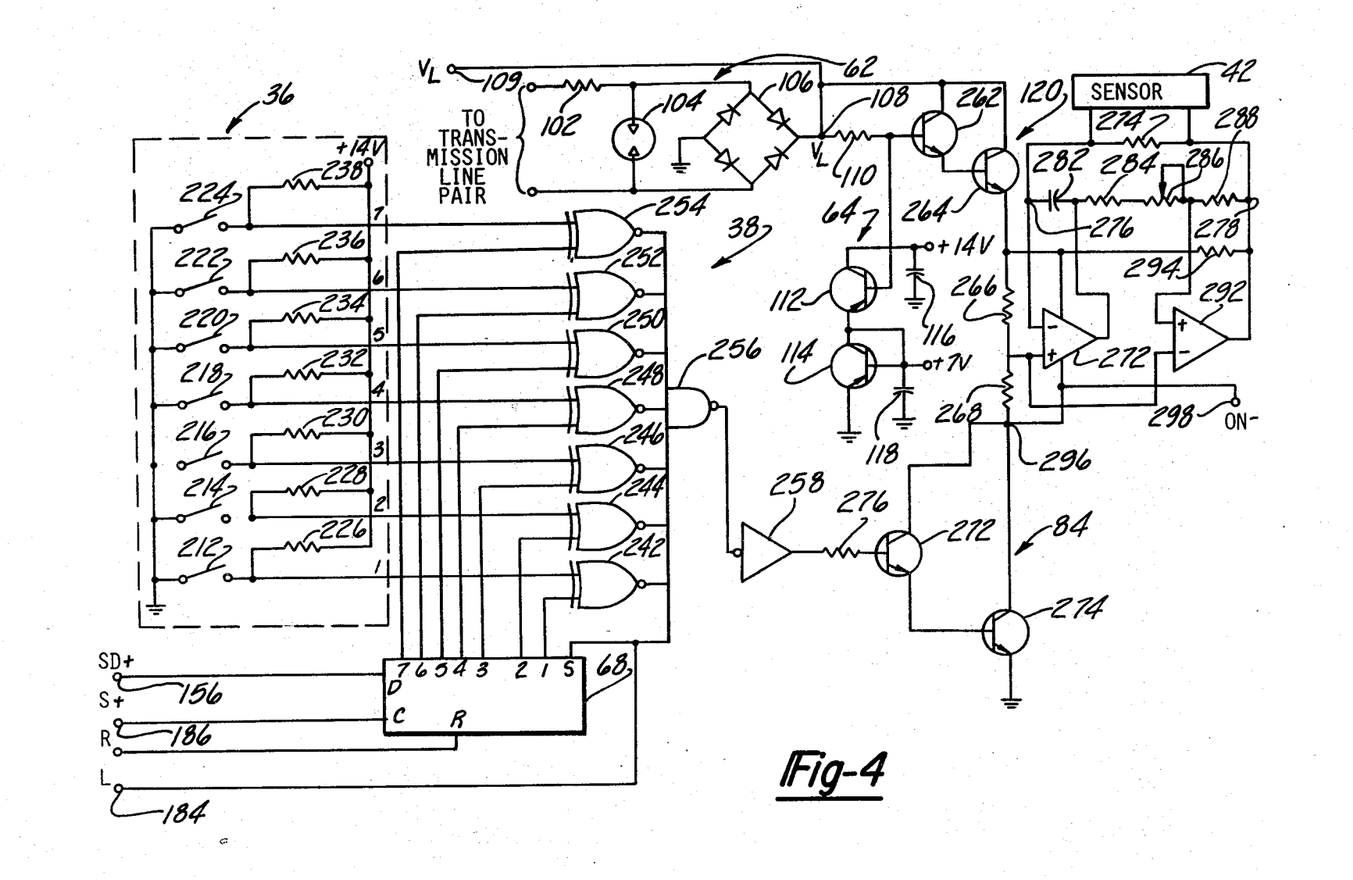

The shift register 68, shown in FIG. 4, serves to store an incoming address and it also counts the number of pulses in the address signal for inhibiting the input when a full address is received. The shift register is an eight bit shift register. The serial data signal SD+ is applied from the terminal 156 to the data input D of the shift register. The shift signal S+ is applied from the terminal 186 to the clock input C, and the reset signal is applied from the terminal 206 to the reset input R. The shift register has an output of eight bit lines that are connected with the respective output S and 1 through 7. The output bit lines are connected with the comparator 38 in a manner which will be described subsequently. When an address signal is received, the pulses of the serial data signal SD+ represent either a logic one or a logic zero, the logic one pulses being 100 milliseconds duration and the logic zero pulses being 50 milliseconds duration. As noted above, the pulses of the shift signal S+ are about 75 milliseconds duration and have leading edges coincident with the address pulses. The shift register operates to register a logical one if the data input is at logic high when the clock input goes high and it registers a logic zero if the data input is at logic low when the clock input goes high. Accordingly, the 100 millisecond address pulses are clocked into the register as logic ones and the 50 millisecond pulses are clocked in as logic zeros. On receipt of the start pulse, which is a logical one for all addresses, output seven goes high. Upon receipt of the succeeding code pulses of the address signal, the logic one of the start pulse is shifted successively one position for each pulse until it is shifted to the output S upon receipt of the eighth pulse of the address. At this point the shift register is full and stores the received address, with a logic one or a logic zero in each of the outputs 1 through 7. This output is applied to the comparator 38, as stated above, and the comparator is operative to determine whether the stored address is identical to the address assigned to the transducer.

The address assigned to the transducer is stored in the address memory 36. As shown in FIG. 4, the address memory 36 comprises a set of seven address switches 212, 214, 216, 218, 220, 222 and 224. The movable contacts of all of the switches are connected to ground. The fixed contact of switch 212 is connected through a pull up resistor 226 to the regulated 14 volt supply. Similarly, the fixed contacts of the switches 214, 216, 218, 220, 222 and 224 are connected through respective pull up resistors 228, 230, 232, 234, 236 and 238 to the regulated 14 volt supply. When one of the address switches is open, its fixed contact is at logic high and when it is closed, it is at logic low. Thus, the address of the transducer is set into the address memory by selectively opening or closing the switches and the assigned adress is stored in the memory. The address memory 36 has outputs 1 through 7 which are at logic high or logic low and thereby represent the assigned address of the transducer. The outputs of the address memory are applied to one set of inputs to the comparator 38.

The comparator 38 comprises a set of seven exclusive-NOR gates 242, 244, 246, 248, 250, 252 and 254. The outputs 1 through 7 of the address memory are each connected to one input of the respective exclusive-NOR gates 242, 244, 246, 248, 250, 252 and 254; and the outputs 1 through 7 of the shift register 68 are each connected to the other inputs of the respective exclusive-NOR gates. The outputs of all of the exclusive-NOR gates are connected to respective inputs of an eight-input NAND gate 256. Output S of shift register 68 is connected to the remaining input of the NAND gate 256. The output of the NAND gate 256 is connected to the input of an inverter 258. When the address held in the shift register 68 is the same as the address stored in the address memory 36, the output of each of the exclusive-NOR gates will be at logic high. The start bit at output S of the shift register 68 is also at logic high. Accordingly, the output of the NAND gate 256 is at logic low. This causes the output of the inverter 258 to be at logic high. Thus, when the received address is not the same as the assigned address, the output of the comparator (at the output of inverter 258) is at logic low and when the addresses are the same, it is at logic high.

It is noted that the output S of the shift register 68 is utilized as an inhibit signal L+ and it applied through a terminal 184 to one input of the NOR gate 182 (FIG. 5). When the address signal is fully loaded into the shift register 68, the start bit will cause the output S thereof, and hence the inhibit signal L+, to go to logic high. This causes the output of the NOR gate 182 to go to logic low and it is held at logic low until the shift register is reset. Accordingly, when the register has received a complete address, no further shift pulses are applied to the shift register.

As discussed previously, the output of the comparator 38 is applied to a control signal to the electronic switch 84 of the oscillator 40. The electronic switch 84 is connected in the voltage supply circuit 120 of the oscillator 40. The voltage supply circuit 120, as shown in FIG. 4, is connected across the line voltage $V_L$ from terminal 108 to ground. This circuit includes a pair of transistors 262 and 264 connected in a Darlington circuit with the collectors connected to the terminal 108 and the base of the transistor 262 connected with the resistor 110. The circuit also includes a pair of resistors 266 and 268 in series between the transistor 264 and the electronic switch 84. The electronic switch 84 comprises a Darlington connection of transistors 272 and 274 with the collectors connected to resistor 268 and the emitter of transistor 274 connected to ground. The base of transistor 272 is connected to the output of the comparator 38 (at inverter 258) through a resistor 276. When the output of the comparator 38 is at logic low, the electronic switch 84 is open and the voltage supply circuit for the oscillator 40 is open. When the output of the comparator goes to logic high, the Darlington transistors 272–274 are turned on and the supply voltage circuit for the oscillator 40 is completed.

The oscillator 40 is energized from the voltage supply circuit 120. As discussed above, the oscillator 40 is a variable frequency, current sink oscillator which is adapted to provide current modulation on the transmission line pair 12. The oscillator comprises an op amp 272 having its supply voltage input connected to the junction of resistor 266 and the emitter of transistor 264 and having its ground return connected through the electronic switch 84 to ground. The non-inverting input of the op amp 272 is connected to the junction of resistors 266 and 268. The inverting input of the op amp 272 is connected with one terminal of a frequency determining network. The frequency determining network includes the sensor 42 which is connected in parallel with a resistor 274 between a node 276 and a node 278. A capacitor 282, fixed resistor 284, variable resistor 286 and fixed resistor 288 are connected in series between the nodes 276 and 278. The output of the op amp 272 is connected to the junction of capacitor 282 and resistor 284. The oscillator also includes an op amp 292. The non-inverting input of the op amp 292 is connected to the junction of resistor 286 and 288. The inverting input of the op amp 292 is connected to the junction of resistors 266 and 268. The output of the op amp 292 is connected to the node 278 and to one terminal of a resistor 294 which has its other terminal connected to the junction of resistor 266 and the emitter of transistor 264. The op amp 272 functions in the manner of an integrator and the op amp 292 functions in the manner of a Schmidt trigger providing feedback to the op amp 272. The op amp 272 produces a triangular output waveform and the op amp 292 produces a square wave output. The resistor 294 draws a square wave current from the supply voltage circuit 120 and thereby produces square wave current modulation on the transmission line pair 12 having the frequency of the oscillator 40. When the oscillator 40 is turned on, by closing the electronic switch 84, the voltage across the switch goes low at a node 296. The voltage at this node is used as a control signal ON−, which is applied to a terminal 298 used for controlling the automatic reset circuit 88, which will now be described.

The automatic reset circuit 88, as shown in FIG. 5, is adapted to turn the oscillator off a predetermined time after turn-on, in the event that it does not turn off in normal operation. In normal operation, the oscillator will be turned off in response to the next address signal on the transmission line pair 12; the central station 10 transmits the next address signal immediately after it has received the answering data signal from the transducer being interrogated. When the next address signal is sent out, the start pulse is effective to reset the shift register 68 which causes the output of the comparator 38 to go low and turn off the electronic switch 84 and the oscillator 40. This is normally done within a time period of about four seconds. The automatic reset circuit 88 is effective to turn off the oscillator after a time period of about six seconds. The reset circuit comprises an op amp 302 having its non-inverting input connected with the 7 volt regulated supply. The inverting input of the op amp receives the signal ON− from the terminal 298 through a time constant circuit. The time constant circuit includes a resistor 304 and a diode 306 connected in parallel between the terminal 298 and the inverting input of the op amp; it also includes a capacitor 308 connected between the inverting input and ground. When the oscillator is turned on, the signal ON− goes from logic high to logic low and the output of the op amp 302 goes from logic low to logic high. The output of the op amp is connected to one input of the NOR gate 158 and the output thereof goes to logic low. This output is applied to one input of the negative input NAND gate 204. The other input of gate 204 is at logic low and the output of the NAND gate 204 goes high producing a reset signal R which resets the shift register 68. When the shift register is reset, the output of the comparator 38 goes low and the electronic switch 84 is opened turning off the oscillator 40.

Figure 7:
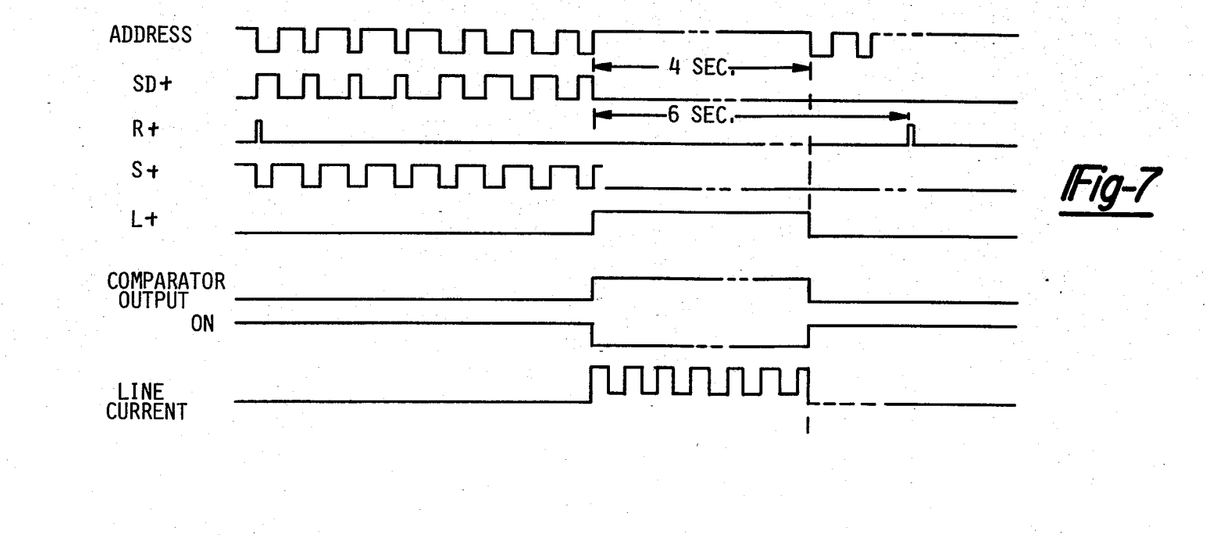
FIG. 7 is a timing diagram for aid in explanation of operation of the addressable transducer.

The operation of the addressable transducer in the monitoring system will be summarized with particular reference to the timing diagram of FIG. 7. In normal operation of the monitoring system, the base station 10 under the control of the computer 50 will successively interrogate the transducers connected with the transmission line pair 12. This is initiated by transmitting the address signal of one of the transducers, for example transducer 20. The address signal is produced at the central station by the address generator 52 which generates the address signal by pulse width and amplitude modulation of the line voltage $V_L$. The modulated line voltage is applied through the signal and power supply circuit 32 to the address detector 34. In the address detector, the level shift detector 66 produces a serial data signal SD+ which is the inverse of the address pulses. The start pulse is effective through the reset generator 78 to produce a reset pulse which clears the shift register 68. The serial data signal SD+ is applied to the data input of the shift register. It is also applied to a shift pulse generator 72 which produces a shift signal S+ which is applied to the clock input of the shift register 68. Accordingly, the address signal is clocked into the shift register in the form of an eight bit binary code with a logic high or logic low for each bit. When the eighth bit of the address signal is clocked into the shift register 68, the start bit, which is always a logic one, will be shifted to the S output of the register. This causes the S output to go high and the inhibit signal L+ goes high and inhibits the NOR gate 182. Accordingly, the shift signal S+ goes low and the shift register stores the received address.

If the received address is equal to that in the assigned address memory 36, the output of the comparator 38 goes to logic high which turns on the electronic switch 84. This starts the oscillator 40 which produces current modulation of the line current in the transmission line pair 12 at the frequency of the oscillator. The oscillator frequency, which constitutes the data signal, is determined by the sensor 42 in accordance with the value of the physical quantity being monitored. The frequency of the current modulation is measured at the central station 10 and processed by the computer to produce a readout of the value of the monitored quantity.

Immediately after the data signal is received at the central station, the address signal of the next transducer to be interrogated is applied to the address generator 52. This address signal is received by the transducer 20 and the start pulse thereof will cause a reset signal to be applied to the shift generator 68. Accordingly, the output of the comparator will go low and the oscillator 40 will be turned off. The address being received will be clocked into the shift register. However, it will not be the same as the assigned address of transducer 20 and accordingly, the output of the comparator 38 will remain low and the oscillator 40 will not be turned on.

Although the description of this invention has been given with reference to a particular embodiment, it is not to be construed in the limiting sense. Many variations and modifications of the invention will now occur to those skilled in the art. For a definition of the invention, reference is made to the appended claims.

What is claimed is:

1. An addressable transducer for use in a monitoring system of the type including a central station and multiple addressable transducers for monitoring the value of selected physical conditions, at multiple locations with one of said transducers at each of said multiple locations, said system being characterized by a single pair of transmission lines extending from the central station to all of said multiple locations and having a voltage thereon which is modulated at controlled intervals to produce successive address signals for selectively addressing one of the multiple transducers to obtain a data signal therefrom, said transducer comprising:

an address detector coupled with said pair of lines and adapted to produce a control signal in response to a predetermined address signal, a current sink oscillator having a frequency determining circuit for determining the oscillator frequency and being adapted to oscillate in response to application of an operating voltage, a sensor including a condition responsive impedance element coupled with said frequency determining circuit and adapted to modify said oscillation frequency according to variations in value of a selected physical condition, a voltage supply circuit coupled with said current sink oscillator for supplying an operating voltage thereto, and switching means for operatively coupling said voltage supply circuit to said pair of lines for deriving an operating voltage therefrom, said switching means being responsive to said control signal for coupling said voltage supply circuit to said pair of lines, whereby said current sink oscillator draws current from said pair of lines, said current having an undulating amplitude at the frequency of the oscillator whereby the frequency of the undulating current in said lines at said central station corresponds to the value of said physical condition.

2. The invention as defined in claim 1 wherein, said address detector comprises means for converting a pulse width modulated binary address signal to a pulse amplitude binary address signal, means for storing a pulse amplitude binary address signal assigned to the transducer, and a comparator coupled between said means for converting and said means for storing for producing said first said control signal when said address signals are the same.

3. The invention as defined in claim 2 wherein, said means for converting comprises a level shift detector having an input coupled with said voltage supply circuit, a shift pulse generator coupled with the output of the level shift detector, and a shift register having a data input coupled with the output of the level shift detector and a clock input coupled with the output of the shift pulse generator, whereby said address signal is stored in said shift register.

4. The invention as defined in claim 3 including, a reset generator and gate means coupled between said level shift detector and said shift register, a reset logic circuit coupled between said level shift detector and said shift pulse generator having an output connected with said gate means, whereby said shift register is reset upon receipt of the leading pulse of each address signal.

5. An addressable transducer for use in a monitoring system of the type including a central station and multiple addressable transducers for monitoring the value of selected physical conditions at multiple locations with one of said transducers at each of said multiple locations, said system being characterized by a single pair of transmission lines extending from the central station to all of said multiple locations and having a voltage thereon which is modulated at controlled intervals to produce successive address signals for selectively addressing one of the multiple transducers to obtain a data signal therefrom, said transducer comprising:

an address detector coupled with said pair of lines and adapted to produce a control signal in response to a predetermined address signal, a current sink oscillator having a frequency determining circuit for determining the oscillator frequency and being adapted to oscillate in response to application of an operating voltage, a sensor including a condition responsive impedance element coupled with said frequency determining circuit and adapted to modify said oscillation frequency according to variations in value of a selected physical condition, switching means for operatively coupling said oscillator to said pair of lines for deriving an operating voltage therefrom, said switching means being responsive to said control signal for coupling said oscillator to said pair of lines, a voltage supply circuit connected across said pair of transmission lines through said switching means, said voltage supply circuit being coupled with said oscillator to provide an operating voltage for the oscillator, and timing means operatively coupled between said oscillator and said switching means for actuating said switching means to remove said operating voltage at a predetermined time interval after it is applied, whereby said oscillator draws current from said pair of lines, said current having an undulating amplitude at the frequency of the oscillator whereby the frequency of the undulating current in said lines at said central station corresponds to the value of said physical condition.

* * * * *